United States Patent
Jørgensen et al.

(10) Patent No.: US 9,023,157 B2
(45) Date of Patent: *May 5, 2015

(54) DRIVE SYSTEM FOR A CLEANING HEAD DISPOSED IN A TANK

(75) Inventors: Hans Erik Jørgensen, Ishøj (DK); Leon Hjorslev, Ishøj (DK)

(73) Assignee: Alfa Laval Tank Equipment A/S, Ishoj (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/702,379

(22) Filed: Feb. 9, 2010

(65) Prior Publication Data

US 2010/0132138 A1    Jun. 3, 2010

Related U.S. Application Data

(63) Continuation of application No. 12/096,058, filed as application No. PCT/DK2006/000642 on Nov. 20, 2006.

(30) Foreign Application Priority Data

Dec. 30, 2005    (DK) .................................. 2005 01853

(51) Int. Cl.
  *B08B 3/02* (2006.01)
  *B63B 57/02* (2006.01)
  *B08B 9/093* (2006.01)
  *H02K 49/06* (2006.01)
  *B05B 3/04* (2006.01)

(52) U.S. Cl.
  CPC .............. *B63B 57/02* (2013.01); *B05B 3/0422* (2013.01); *B08B 9/0936* (2013.01); *H02K 49/065* (2013.01)

(58) Field of Classification Search
  USPC ........................................................ 134/166 R
  See application file for complete search history.

(56) References Cited

U.S. PATENT DOCUMENTS 2,488,827 A * 11/1949 Pensabene .................... 310/105
3,171,356 A *  3/1965 Pensabene .................... 417/357
(Continued)

FOREIGN PATENT DOCUMENTS

EP        0084342 A     7/1983
EP         084342 A2    7/1983
(Continued)

OTHER PUBLICATIONS

Trinity College Dublin—website "Modern Magnets—Permanent at last" pp. 1-3.*

(Continued)

*Primary Examiner* — Michael Barr
*Assistant Examiner* — Jason Riggleman
(74) *Attorney, Agent, or Firm* — Buchanan Ingersoll & Rooney PC

(57) ABSTRACT

When, according to the invention, constructing a drive system for rotating a cleaning head in a tank and allowing the system to comprise a hysteresis coupling having two magnetic parts, one being present inside the liquid space (4) and the other outside the liquid space, respectively, a completely liquid-tight separation between the housing (2) and a gear (14) may be ensured. The magnetic part (8, 18) of the hysteresis coupling may be formed by electromagnets, and with a displaceable (13) position of one part relative to the other part (11, 19), the coupling may be adjusted with respect to the transferred torque and/or speed.

7 Claims, 3 Drawing Sheets

(56) References Cited

U.S. PATENT DOCUMENTS

Figure 1:
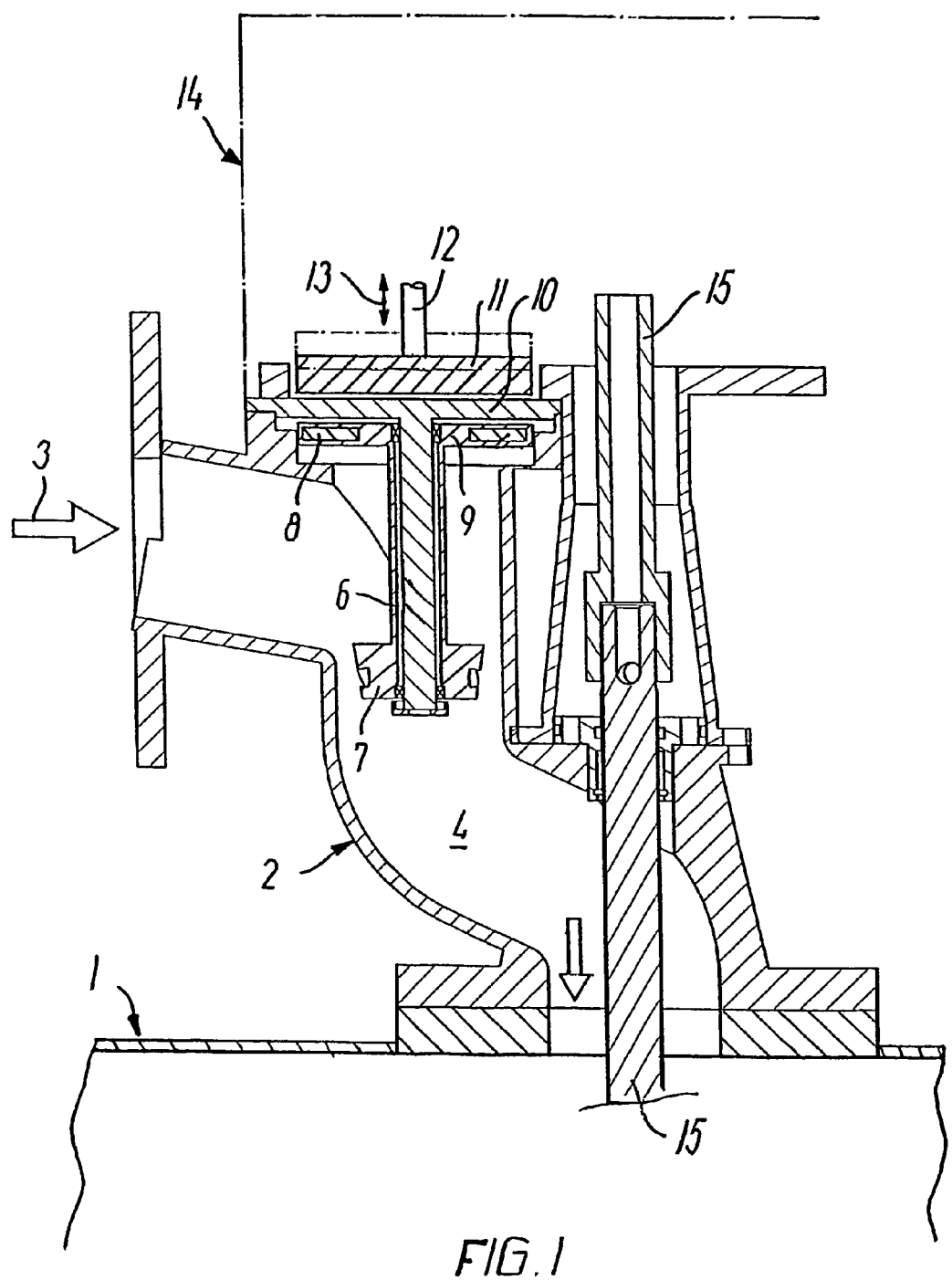

| | | | |
|---|---|---|---|
| 3,584,790 A | | 6/1971 | Bonfield |
| 3,874,594 A | | 4/1975 | Hatley |
| 5,092,523 A | | 3/1992 | Rucker et al. |
| 5,351,885 A | | 10/1994 | Manabe |
| 5,640,983 A | * | 6/1997 | Sherman et al. .......... 134/167 R |
| 5,871,023 A | | 2/1999 | Sherman, Jr. et al. |
| 7,927,432 B2 | * | 4/2011 | Jorgensen et al. ........ 134/166 R |
| 2004/0089329 A1 | | 5/2004 | Bijster |

FOREIGN PATENT DOCUMENTS

| | | |
|---|---|---|
| EP | 0723909 | 7/1996 |
| EP | 0723909 A | 7/1996 |
| EP | 1 521 704 B1 | 8/2009 |
| GB | 1446198 A | 8/1976 |
| JP | 61-025990 A | 2/1986 |
| JP | 2299457 A | 12/1990 |
| JP | 07-243388 A | 9/1995 |
| JP | 08-252552 A | 1/1996 |
| JP | 2005-233326 A | 9/2005 |
| WO | WO9417922 | 8/1994 |
| WO | WO2004/007274 A | 1/2004 |
| WO | WO2004/007274 A1 * | 1/2004 .............. B63B 57/02 |
| WO | WO2004007274 | 1/2004 |

OTHER PUBLICATIONS

International Search Report for PCT/DK2006/000642 on Jan. 16, 2007.

Indian Office Action issued Oct. 21, 2014, by the Indian Patent Office, in corresponding Indian Patent Application No. 3944/CHENP/2008 (2 pages).

Japanese Office Action (Notice of Reasons for Rejections) dated Sep. 15, 2010, issued by the Japanese Patent Office in corresponding Japanese Application No. 2008-547851, and an English Translation of the Japanese Office Action. (2 pgs.).

* cited by examiner

DRIVE SYSTEM FOR A CLEANING HEAD DISPOSED IN A TANK

CROSS REFERENCE TO RELATED APPLICATIONS

This application is a continuation of U.S. patent application Ser. No. 12/096,058 filed 4 Jun. 2008 which was a National Stage of PCT International Application no. PCT/DK2006/000642 filed 20 Nov. 2006 claiming priority in Danish patent application no. PA2005-01853 filed 30 Dec. 2005.

THE PRIOR ART

The invention relates to a drive system for rotating a cleaning head in a tank, the drive system comprising a housing having a propeller mounted in a liquid channel to which cleaning liquid is supplied under pressure, as well as a gear which is driven by the propeller, and which is mounted separated from the cleaning liquid in the housing as a safeguard against leakage of cleaning liquid, the gear transferring the rotation produced by the propeller to a reduced rotation of the cleaning head in the tank, wherein the rotation produced by the propeller is transferred to the gear via a magnetic coupling having coupling parts, one coupling part being disposed inside the housing in the liquid channel and the other coupling part being disposed outside the housing, and wherein the coupling parts are configured either as mutually parallel discs or as two cylindrical, concentrically mounted discs.

As a safeguard against leakage it is known to separate the driving propeller shaft, which extends in the liquid flow, from the gear itself, which is mounted outside the liquid flow. This may take place by means of various gaskets and stuffing boxes, but it has been found that these do not always operate reliably, in particular after wear, liquid exposure and ageing.

To improve these conditions, it is known to separate the parts completely by a wall between the liquid channel and the outer side of the housing when transferring the torque via a magnetic drive system, where the magnetic part driven by the propeller is mounted inside the liquid flow, while the driven magnetic part mounted outside the housing is connected with the gear. Thus, the parts are coupled together magnetically to transfer the torque and the rotation caused thereby.

Figure 2:
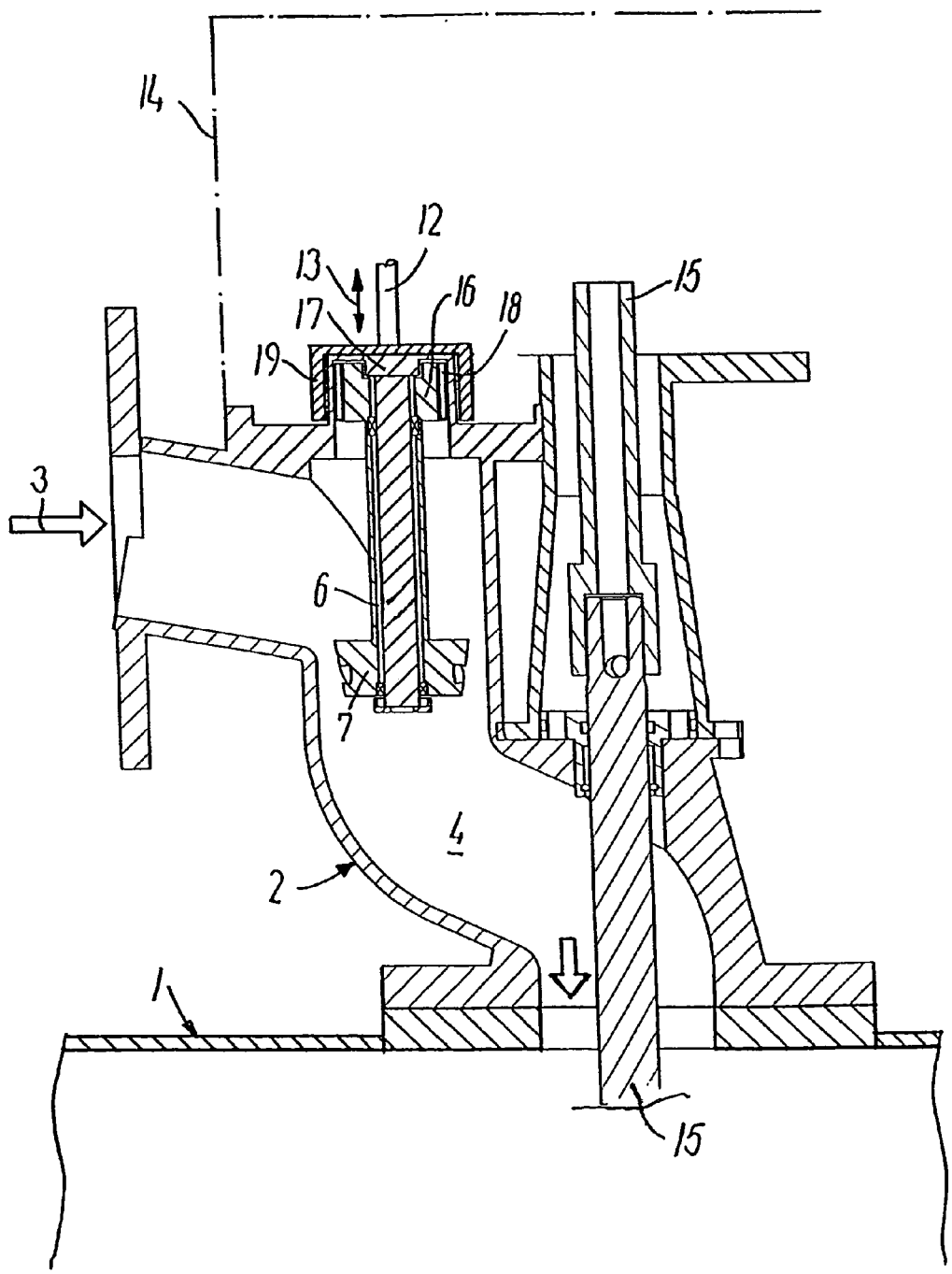

Such a drive system for a tank cleaning system is disclosed in the European Patent EP 0 723 909 A1, where it may be seen in FIG. 2 that the propeller inside the liquid channel drives a disc-shaped magnetic part, which is seated internally in the channel, and which is coupled magnetically to another disc-shaped magnetic part outside the channel. It is stated in claim 2 of the document that both magnetic parts are composed of permanent magnets. It is moreover stated that the magnetic parts may have another configuration than the shown parallel discs, it being stated that the one magnetic part may be disposed inside the other. Speed adjustment may be performed by manually adjusting a counter nut, so that the position and the spacing of the propeller from the walls in the channel are displaced, thereby causing a change in the speed of rotation of the propeller.

Another European Patent, EP 0 084 342 A2, discloses a washing machine for cleaning surgical instruments, such as e.g. endoscopes and the like. The washing machine is equipped with a set of rotatable washing nozzles which are driven by a motor arranged outside the washing machine, the motor transferring its rotation via a magnetic coupling to the rotatable set of washing nozzles. No gear mechanisms are included in the system, and its speed cannot be adjusted. The document mentions parallel disc-shaped magnetic parts as well as cylindrical, concentrically arranged magnetic parts. It is stated that the magnetic parts are equipped with permanent magnets, but that they may also be constructed as electromagnets. No great torque has to be transferred in order to start the washing machine, and the reaction force of the nozzles will contribute to rotating the washing nozzles in the washing machine.

In practice, however, it is difficult to make such a magnetic coupling having permanent magnets work in connection with cleaning heads for tanks, especially because of a relatively great starting torque and the high speed of rotation of the driving magnetic part at the moment of start. These conditions may have as a result that the driven part does not enter into magnetic engagement and thus cannot transfer the torque. Such a situation occurs when the starting torque exceeds the maximum torque of the coupling. The coupling slips in a jerky and shaking manner, because the magnetic forces are interrupted and can then only transfer very small torques. Couplings of this type having permanent magnets are called synchronous couplings for the same reason, precisely because it is a requirement that the coupling parts move together. In other words, it is necessary to dimension the coupling such that its maximum torque is considerably greater than its starting torque if the system is to be able to start. Synchronous couplings having a torque of up to 1000 Nm are known.

To this should be added that such a magnetic coupling cannot readily be set to transfer a variable torque or a variable speed.

THE OBJECT OF THE INVENTION

The object of the invention is to remedy these many drawbacks, and this is achieved by means of a drive system, wherein the rotation from the propeller is transferred to the gear by a hysteresis coupling comprising a rotating magnetic inductor driven by the propeller, or a hysteresis part in the housing which drives a rotating part mounted outside the housing, either of a ferromagnetic hysteresis material or a magnetic part which is connected with the input shaft of the gear.

Such a hysteresis coupling provides for an unprecedented possibility of ensuring a quite certain torque transfer of the rotating movement also at the start phase for cleaning heads for tanks. It has been found that in spite of the great difference in the speed of rotation at the moment of start between the driving and the driven magnetic parts, the hysteresis coupling is capable of supplying a torque which is sufficiently great to accelerate the driven magnetic part and thereby the gear in terms of speed, if it is dimensioned correctly, that is that it can transfer a torque which is greater than the starting torque. The advantageous properties of the hysteresis coupling include e.g. its ability to transfer an almost constant torque independently of the relative speed between the coupling parts, and the ability of the coupling to operate with a continuous or varying slip, the slip being "soft" and without any detrimental effect on the structure.

The mutual position of the inductor and the hysteresis part may be selected freely in dependence on the conditions, so that one part may be placed either "dry" in the gear or in the liquid flow in the housing.

This hysteresis coupling will operate in a housing of a non-magnetic material, such as stainless steel, which is a preferred material for use in connection with cleaning equipment of this type.

The drive system is maintenance-free and will therefore not require any form of service.

When the gap between the coupling parts may be varied, it is possible to adjust the energy content in the gap and thereby the magnetic forces between the coupling parts, whereby the coupling may be adjusted to transfer a given torque and/or a given speed.

When the magnetic field is produced either by means of permanent magnets or by means of electromagnets, desired magnetic properties may be achieved, and as far as the electromagnets are concerned, also a variable field strength.

Finally, it is expedient to transfer the rotating movement of the gear to the cleaning head via a further magnetic or hysteresis coupling, as a total separation between the liquid part and the gear may be achieved thereby.

THE DRAWINGS

Figure 3:
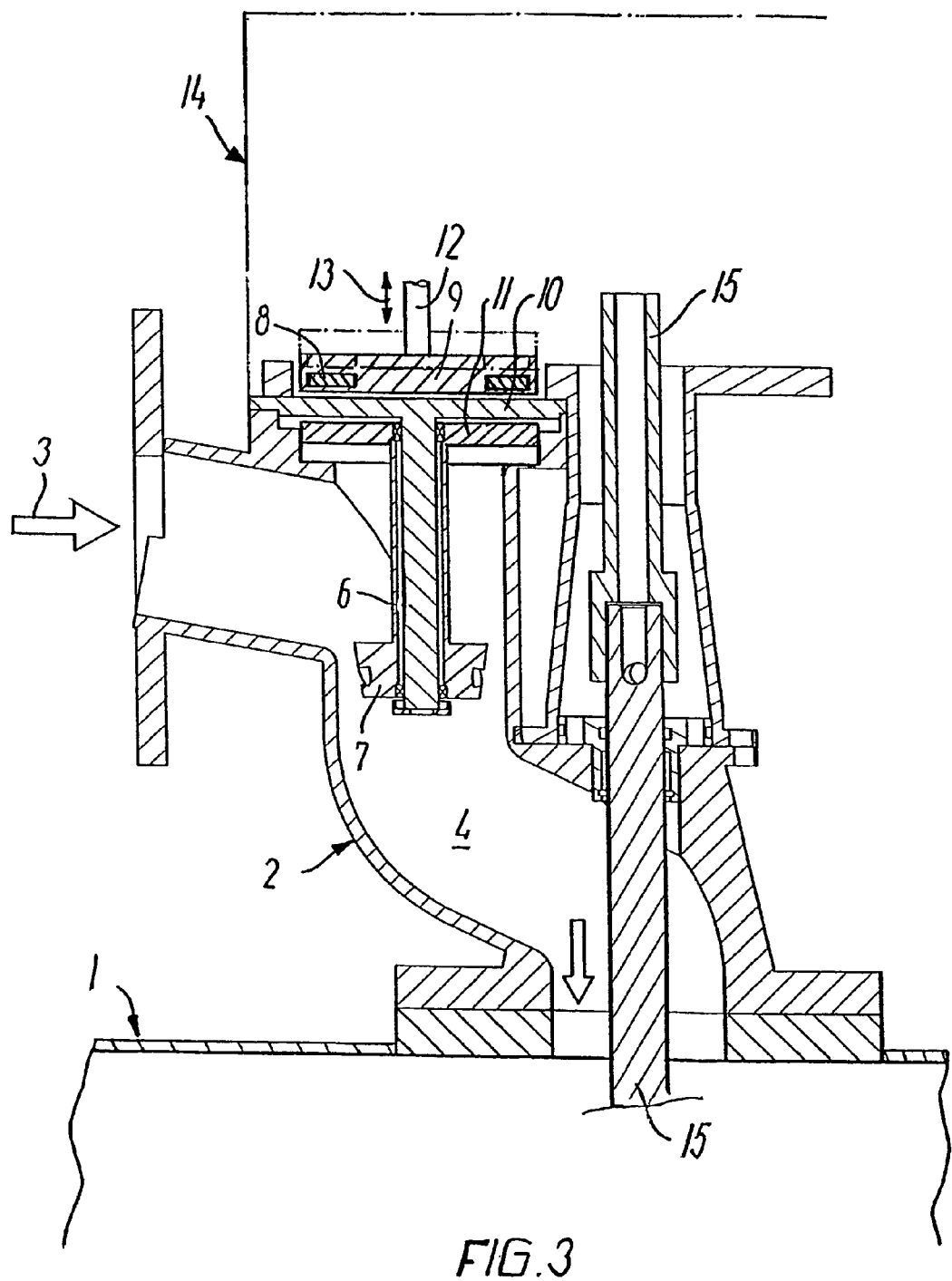

Preferred exemplary embodiments according to the invention will be de-scribed more fully below with reference to the drawing, in which:

FIG. 1 shows a sectional view of a drive system having magnetic parts mounted in parallel, FIG. 2 shows a similar system having concentrically mounted magnetic parts, and FIG. 3 shows a sectional view of a drive system with a reverse position of the magnetic parts relative to the example in FIG. 1.

DESCRIPTION OF THE EXEMPLARY EMBODIMENTS

Three exemplary embodiments shown in FIG. 1, FIG. 2 and FIG. 3, respectively, will be described below.

Apart from the hysteresis coupling itself, a section through the driving part of the cleaning equipment is shown in the examples, viz. a housing 2 which has a liquid inlet 3 for cleaning liquid under pressure, said liquid flowing past a propeller 7 which is thereby caused to rotate with a speed of rotation of several thousand revolutions per minute. The rotation of the propellers 7 is transferred via a shaft 6 to the magnetic part 8, 9 placed in the housing 2.

The liquid flow is conveyed through the channel 4 as liquid which is conveyed via a pipe (not shown) to the cleaning head, which is present down in the tank 1.

The cleaning head is rotatable by means of a rotary shaft 15, and it is also provided with rotating nozzles to eject cleaning liquid under pressure and thereby to clean the entire internal surface of the tank.

Since the rotation of the cleaning head takes place at low revolutions, a gear must be interposed between the driving propeller 7 and the rotary shaft 15.

This gear is mounted on the housing 2, as indicated by a simple line 14.

The input shaft of the gear is indicated at 12, and its output shaft having a reduced speed of rotation is indicated at 15.

The housing 2 with the gear is mounted externally on the tank 1, as indicated.

There is no connection between the driving propeller 7 mounted in the liquid channel 4 and the driven part in that the housing 2 is completely closed off as a safeguard against leakage at the wall part 10.

Moreover, the leakage safeguard may be enhanced by establishing a physical separation (not shown) between the gear and the rotary shaft 15 by mounting, in a quite similar manner, a further hysteresis coupling for transferring the rotary movement. This coupling (not shown) may be constructed similar to the coupling which is shown, and which will be described below.

The first exemplary embodiment, which is shown in FIG. 1, will be described now.

The propeller 7 is secured to a shaft 6, which, at the top, is provided with a disc-shaped magnetic inductor 9 provided with a plurality of permanent magnets 8.

These magnets 8 produce a magnetic field, and few magnets having a great polarizing face of e.g. the AlNiCo magnetic type may be used, or a large number of small permanent magnets having a great magnetic force and small surface areas may be selected.

Instead of the magnets 8, electromagnets may be mounted, which have the advantage that the strength of the magnetic field may be varied steplessly by changing the voltage. This provides for the option of a variable adjustability of the torque and/or the speed which is to be transferred via the coupling.

As shown in FIG. 1, the housing 2 is closed by means of a wall part 10.

The hysteresis part in the form of a disc 11 is mounted on the outer side of this wall part 10, said disc extending in parallel with the disc-shaped inductor 9 and such that they are both rotatable about the same axis of rotation.

The disc 11 is preferably made of a magnetic material containing metal oxides, such as $Fe_2O_3$ powder which is electrically insulated. This material has a high isotropic electrical resistance which effectively prevents the generation of eddy currents in the hysteresis part. Further, the magnetic properties are good, even at relatively high temperatures.

Instead of this embodiment, it is conceivable to use a laminated material having layers of a ferromagnetic hysteresis material, which are insulated from each other by means of dielectric films.

The structure of this coupling is such that it can transfer a torque generated by the propeller 7 to the input shaft 12 of the gear in a manner which comprises parts that are separated from each other by means of an air gap and a wall.

Experience has shown that a relatively large gap between the magnetic parts results in a lower torque and/or a lower speed transferred via the coupling.

In order to be able to adjust the coupling and thereby the torque, the hysteresis part is mounted on the shaft 12 such that it may be adjusted in an axial direction, as indicated by arrows 13. In a generally known manner, the coupling may be made adjustable from the outside, e.g. externally on the housing 14.

A second embodiment of the hysteresis coupling is shown in FIG. 2.

The coupling part comprises two concentrically mounted rings, viz. an internally secured magnetic ring 16 with magnets 18 mounted on the shaft 6 and a ring mounted externally on the housing and extending externally on the partition 17.

The cooperating hysteresis ring 19 extends around the partition 17 and the ring 16 with magnets 18, said hysteresis ring being in turn secured to the input shaft 12 of the gear.

This coupling, too, may be adjusted by an axial movement of the outer hysteresis ring 19, thereby changing the torque and/or the speed, as indicated by arrows 13.

This embodiment of the coupling is very compact and can transfer high torques because of the radially extending air gap, which gives a very high torque. Thus, great torques may be transferred with a relatively low magnetization.

In the exemplary embodiments shown in FIGS. 1 and 2, the magnetic part is arranged in the liquid space.

An example of a reverse arrangement of the magnetic parts is shown in FIG. 3, from which it appears that the hysteresis part 11 is disposed in the housing, while the inductive magnetic part 8, 9 is disposed externally on the housing 2.

This position of the inductive part is particularly advantageous where electromagnets are used, as, technically, it is easier to establish the necessary electrical connections in a dry atmosphere. Moreover, it is also possible to utilize the liquid for the cooling of the hysteresis part.

Also the structure shown in FIG. 2 may be "reversed" so that the magnetic part 16, 18 extends externally on the hysteresis part.

Finally, the drive system may be extended with a further magnetic coupling to transfer the rotary movement of the gear to the rotary shaft 15 of the cleaning head.

Total liquid separation between the liquid in the housing 2 and the gear may be achieved hereby, as the housing is thus closed completely and thereby protected against leakage of liquid, caused e.g. by wear of the shaft seals.

The invention claimed is:

1. A drive system for rotating a cleaning head in a tank, said drive system comprising:
   a housing through which cleaning liquid is supplied under pressure;
   a propeller mounted in a liquid channel and being driven by the cleaning liquid passing therethrough,
   a gear being driven by the propeller, the gear being separated from the cleaning liquid passing through the housing, said gear using the rotation produced by the propeller to rotate the cleaning head located in the tank at a reduced rotation rate;
   a magnetic hysteresis coupling interposed between the propeller and the gear for transferring rotation therethrough,
   the magnetic hysteresis coupling having a first coupling part disposed inside the housing in the liquid channel and a second coupling part disposed outside the housing, the first and second coupling parts configured as mutually parallel discs, the magnetic hysteresis coupling having one coupling part being a rotating magnetic inductor and the other coupling part being a hysteresis part, one of the magnetic inductor or the hysteresis part being in the housing and forming the first coupling part, the other of the magnetic inductor or the hysteresis part mounted outside the housing, forming the second coupling part, the second coupling part being driven by the rotation of the first coupling part and being connected to an input shaft for transferring rotation to the gear, the second coupling part being mounted for adjustable displacement in an axial direction relative to the first coupling part for variably changing the distance between the first coupling part and the second coupling part, the change in distance variably changing an amount of torque transferred through the hysteresis coupling parts and/or a speed of rotation transferred through the coupling parts from the propeller driven by the cleaning fluid to the gear rotating the cleaning head,
   wherein the magnetic inductor includes a plurality of permanent magnets or electromagnets and the hysteresis part does not include any permanent magnets or electromagnets.

2. A drive system according to claim 1, wherein the hysteresis part is mounted for adjustable axial displacement outside the housing and the magnetic inductor is mounted inside the housing.

3. A drive system according to claim 1, wherein the magnetic inductor is mounted for adjustable axial displacement outside the housing and the hysteresis part is mounted inside the housing.

4. A drive system according to claim 1, wherein the rotation of the gear is transferred to a drive shaft for the cleaning head via a further hysteresis coupling.

5. A drive system according to claim 1, wherein the propeller is mounted at a free end of a shaft, the shaft being coupled to the gear.

6. A drive system according to claim 1, wherein the hysteresis part is formed of a magnetic oxide powder.

7. A drive system according to claim 6, wherein the magnetic oxide powder is a $Fe_2O_3$ powder which is electrically insulated.

* * * * *